(12) United States Patent
Yi

(10) Patent No.: US 10,164,236 B2
(45) Date of Patent: Dec. 25, 2018

(54) BATTERY PACK

(71) Applicant: Samsung SDI Co., Ltd., Yongin-si, Gyeonggi-do (KR)

(72) Inventor: Sangil Yi, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 268 days.

(21) Appl. No.: 15/084,986

(22) Filed: Mar. 30, 2016

(65) Prior Publication Data

US 2016/0301056 A1 Oct. 13, 2016

(30) Foreign Application Priority Data

Apr. 9, 2015 (KR) ........................ 10-2015-0050323

(51) Int. Cl.
| | |
|---|---|
| *H01M 2/20* | (2006.01) |
| *H01M 10/42* | (2006.01) |
| *H01M 2/10* | (2006.01) |
| *H01M 2/26* | (2006.01) |

(52) U.S. Cl.
CPC ......... *H01M 2/204* (2013.01); *H01M 2/1077* (2013.01); *H01M 10/425* (2013.01)

(58) Field of Classification Search
CPC ........ H01M 2/204; H01M 2/26; H01M 2/105; H01M 2/1061; H01M 10/425; H01M 2220/30
See application file for complete search history.

(56) References Cited

U.S. PATENT DOCUMENTS

| | | |
|---|---|---|
| 7,671,565 B2 | 3/2010 | Straubel et al. |
| 7,683,575 B2 | 3/2010 | Berdichevsky et al. |
| 7,923,144 B2 | 4/2011 | Kohn et al. |
| 8,133,287 B2 | 3/2012 | Hermann et al. |
| 8,133,608 B2 | 3/2012 | Hermann et al. |
| 8,241,772 B2 | 8/2012 | Hermann et al. |
| 2013/0196204 A1 | 8/2013 | Song et al. |
| 2013/0202919 A1 | 8/2013 | Hwang |

FOREIGN PATENT DOCUMENTS

| | | | | |
|---|---|---|---|---|
| JP | 2005-317368 | * | 11/2005 | .............. H01M 2/10 |
| KR | 2013-0089178 A | | 8/2013 | |
| KR | 2013-0090098 A | | 8/2013 | |

* cited by examiner

*Primary Examiner* — Osei K Amponsah
(74) *Attorney, Agent, or Firm* — Knobbe Martens Olson & Bear LLP

(57) ABSTRACT

There is provided a battery pack with improved stability. The battery pack includes a plurality of bare cells including electrode units and arranged in a direction, a holder case configured to accommodate the plurality of bare cells, and a connection tab including a body unit electrically connected to the plurality of bare cells, a slit unit positioned in each of the electrode units of the plurality of bare cells, and at least one welding unit positioned to be adjacent to the slit unit and welded to the electrode unit of the bare cell. The slit unit includes first and second slits separated from each other by a certain distance, first and second bridges respectively provided between ends of the first and second slits, and a welding slit that crosses one point of each of the first and second slits. In the battery pack, one of the first and second bridges is formed to be stepped so that it is possible to rapidly and easily block flow of a current when over-charge or over-discharge occurs. Therefore, stability of the battery pack may improve.

19 Claims, 3 Drawing Sheets

BATTERY PACK

RELATED APPLICATIONS

This application claims priority to and the benefit of Korean Patent Application No. 10-2015-0050323, filed on Apr. 9, 2015, in the Korean Intellectual Property Office, the entire contents of which are incorporated herein by reference in their entirety.

BACKGROUND

Field

The present invention relates to a battery pack.

Description of the Related Art

Recently, with the rapid development of electronics, communications, and computer industries, market demand for a power source capable of generating a large capacity of power is increasing.

Generally, in order to increase the capacity of a bare cell the size of the bare cell is increased and a battery pack is formed of a plurality of bare cells. Various researches on forming one battery pack by using the plurality of bare cells and improving performance of the battery pack by using a connection tab to increase battery capacity are being performed.

SUMMARY OF CERTAIN INVENTIVE ASPECTS

An embodiment of the present invention relates to a battery pack having a structure with improved stability.

Another embodiment of the present invention relates to a battery pack capable of preventing a connection tab and an upper end of a bare cell from contacting to be shorted.

Another embodiment of the present invention relates to a battery pack capable of increasing welding strength between a connection tab and a welding unit.

A battery pack according to an embodiment of the present invention includes a plurality of bare cells including electrode units and arranged in one direction, a holder case configured to accommodate the plurality of bare cells, and a connection tab including a plurality of body units respectively electrically connected to the plurality of bare cells, each body unit having a slit unit positioned on each of the electrode units of the plurality of bare cells, and at least one welding unit positioned to be adjacent to the slit unit and welded to the electrode unit of the bare cell. The slit unit includes first and second slits separated from each other by a certain distance, first and second bridges respectively provided between ends of the first and second slits, and a welding slit that crosses one point of each of the first and second slits.

The first and second bridges may be integrated with the body unit and at least one of the first and second bridges may be formed to be stepped.

The first and second slits may face each other.

A distance between a center of the first slit and a center of the second slit may be smaller than a diameter of the bare cell.

A length of the welding slit may be larger than the distance between the center of the first slit and the center of the second slit.

At least one welding unit may be provided on each of one side and the other side of the welding slit based on the welding slit.

The welding unit may be grooved or embossed with a certain depth in a direction of the electrode unit of the bare cell.

The welding unit may be connected to the electrode unit of the bare cell by resistance welding.

The connection tab may further include a connection unit extending from a region of the body unit and connected to a protective circuit module (PCM) mounted on an external surface of the holder case.

The bare cell may be cylindrical or prismatic.

As described above, in the battery pack according to the present invention, one of the first and second bridges is formed to be stepped so that it is possible to rapidly and easily block flow of a current when over-charge or over-discharge occurs. Therefore, stability of the battery pack may improve.

In addition, in the battery pack according to the present invention, the slit unit is provided in the region corresponding to the electrode unit of the bare cell so that, when the connection tab is connected to the cap assembly by welding, it is possible to prevent the connection tab from contacting the upper end of the cylindrical can adjacent to the cap assembly to generate short.

In addition, in the battery pack according to the present invention, the welding slit is provided in a region adjacent to the welding unit so that wattles current is reduced and welding strength is increased during welding. Therefore, efficiency of work may improve.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF CERTAIN INVENTIVE EMBODIMENTS

Example embodiments will now be described more fully hereinafter with reference to the accompanying drawings;

however, they may be embodied in different forms and should not be construed as limited to the embodiments set forth herein.

The above-described and other objects and new features will become more apparent through the following detailed description with respect to the accompanying drawings.

Hereinafter, a configuration of a battery pack according to the present invention will be described with reference to the accompanying drawings.

Figure 1:
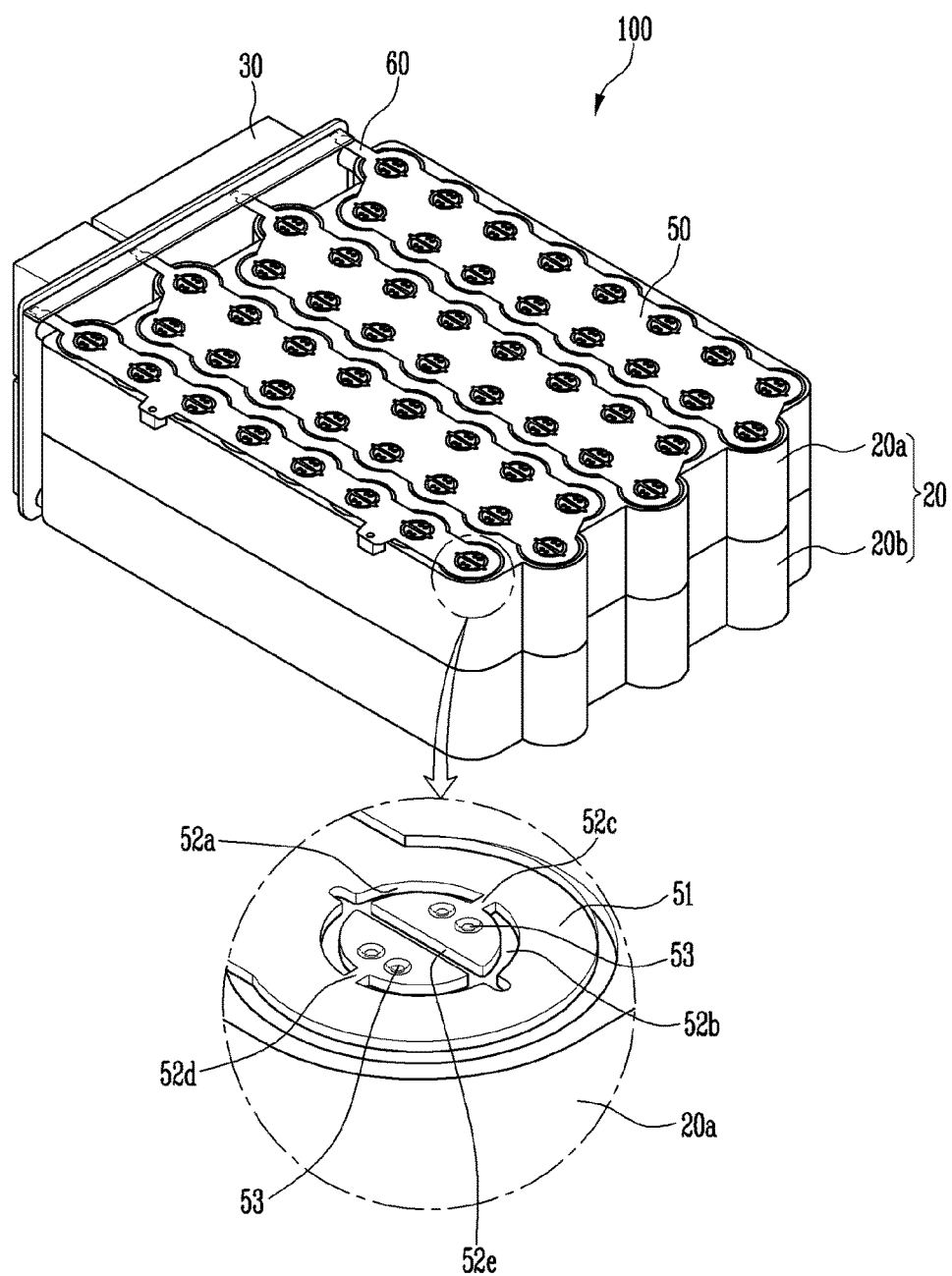
FIG. 1 is a perspective view illustrating a battery pack according to the present invention.
Figure 2:
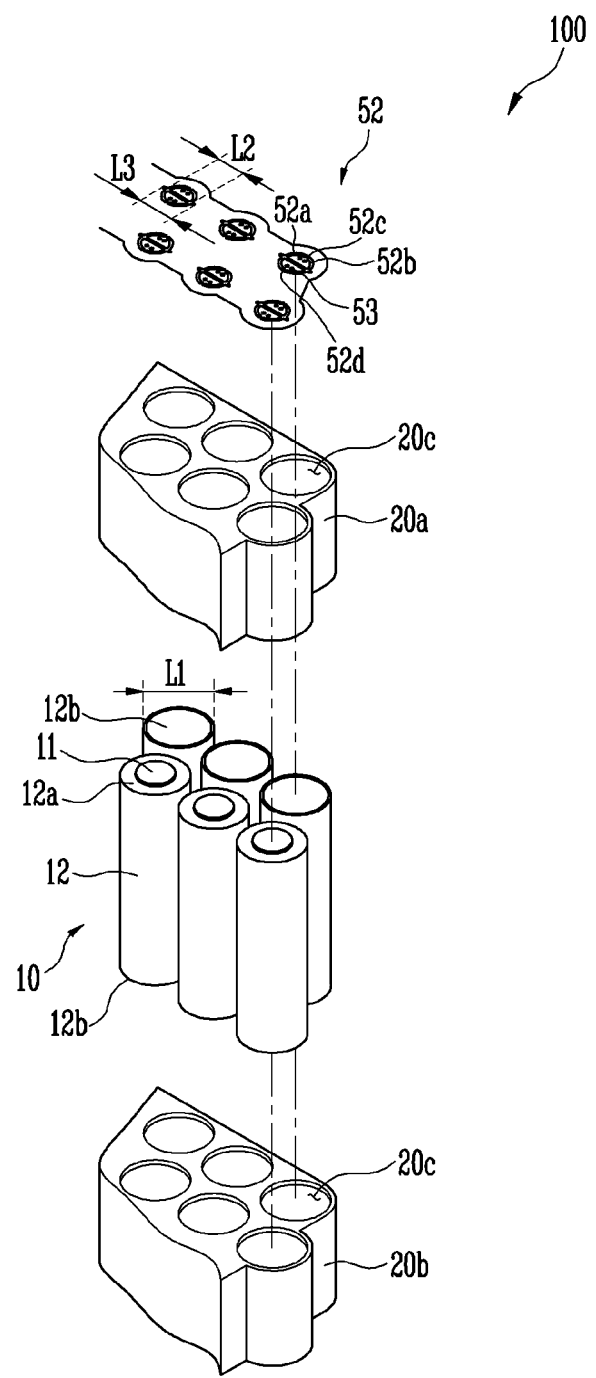
FIG. 2 is an exploded perspective view illustrating a part of the battery pack of FIG. 1.
Figure 3:
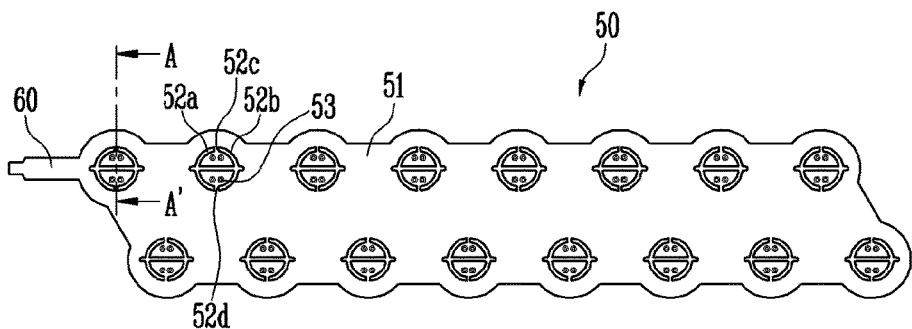
FIG. 3 is a perspective view illustrating a connection tab according to the present invention.

FIG. 1 is a perspective view illustrating a battery pack according to the present invention. FIG. 2 is an exploded perspective view illustrating a part of the battery pack of FIG. 1. FIG. 3 is a perspective view illustrating a connection tab according to the present invention.

As illustrated in FIGS. 1 and 2, a battery pack 100 according to one embodiment includes a plurality of bare cells 10 respectively including electrode units 11 and 12b and arranged in parallel in one direction, and a holder case 20 for accommodating the plurality of base cells 10. The pack 100 also includes a connection tab 50 including a body unit 51 electrically connected to the plurality of bare cells 10, a slit unit 52 positioned in each of the electrode units 11 and 12b of the plurality of bare cells 10, and at least one welding unit 53 adjacent to the slit unit 52 and welded to the electrode unit 11 and 12b of the bare cell 10.

Here, the slit unit 52 includes first and second slits 52a and 52b, first and second bridges 52c and 52d respectively provided between ends of the first and second slits 52a and 52b, and a welding slit 52e that crosses one point of each of the first and second slits 52a and 52b. At this time, the first and second slits 52a and 52b may face each other. At least one welding unit 53 is provided on each of one side and the other side of the welding slit 52e based on the welding slit 52e and may be grooved or embossed with a certain depth in a direction of the electrode unit 11 and 12b of the bare cell 10.

First, referring to FIG. 2, the bare cells 10 that form the battery pack 100 according to the present invention are illustrated as being cylindrical. However, the present invention is not limited thereto. The bare cells 10 are secondary batteries capable of being charged and discharged and may be cylindrical or prismatic in accordance with a design of the battery pack 100. According to the current embodiment, the bare cells 10 are illustrated as being cylindrical.

The bare cell 10 may be formed by accommodating an electrode assembly and an electrolyte in a battery case 12 of which a top is opened and sealing up the top of the battery case 12 by a cap assembly 11. At this time, the battery case 12 may be a cylindrical can. The battery case 12 may be crimped by using a jig so that an upper end 12a curved inward may be provided in order prevent the cap assembly 11 provided therein from deviating. In addition, in the bare cell 10, an opposite surface of the cap assembly 11 may be a bottom 12b of the battery case 12.

The electrode assembly is formed of a positive electrode plate, a negative electrode plate, and a separator interposed between the positive electrode plate and the negative electrode plate. The positive electrode plate and the negative electrode plate may react to the electrolyte to generate electrical and chemical energy. In addition, the positive electrode plate is connected to the cap assembly 11 and the negative electrode plate is connected to the bottom 12b of the battery case 12 to be electrically connected to the outside. Therefore, the cap assembly 11 and the bottom 12b may function as an electrode unit. For example, the cap assembly 11 may function as a positive electrode terminal and the battery case 12, in particular, the bottom 12b may function as a negative electrode terminal. A gasket may be interposed between the cap assembly 11 and the battery case 12 having opposite polarities in order to prevent short. The number and arrangement of bare cells 10 are not limited to the structure of FIG. 1 and may be changed as occasion commands.

The plurality of bare cells 10 include the electrode units 11 and 12b, are arranged in parallel in one direction, and may be accommodated in the holder case 20. The holder case 20 is formed of upper and lower holder cases 20a and 20b. The upper holder case 20a may be formed to surround an external surface of the bare cell 10 while exposing the cap assembly 11 or the bottom 12b corresponding to the electrode unit 11 and 12b of the bare cell 10. Accommodating holes 20c are formed in the upper and lower holder cases 20a and 20b so that the bare cells 10 are accommodated to be separated from each other by a certain distance. The accommodating holes 20c may have a shape corresponding to that of the bare cells 10 in order to prevent the bare cells 10 from moving due to external shock. In addition, a buffer surface formed of an elastic material may be further provided on an internal surface of the accommodating hole 20c in order to more stably accommodate the bare cell 10.

A protective circuit module (PCM) 30 may be provided on one side of the holder case 20. The PCM 30 has electronic parts mounted and forms a protective circuit. The PCM 30 may be fixed to the holder case 20 by screw or hook combination.

Hereinafter, a connection relationship between the plurality of bare cells 10 and the connection tab 50 will be described in detail with reference to FIGS. 1 to 3.

Referring to FIG. 1, the connection tab 50 may be provided on the plurality of bare cells 10 in order to serially connect the plurality of bare cells 10 or connect the plurality of bare cells 10 in parallel. The connection tab 50 may include the body unit 51 electrically connected to the bare cells 10, the slit unit 52 formed in a region corresponding to the electrode unit 11 and 12b of the bare cell 10, and the welding unit 53 welded to the electrode unit 11 and 12b of the bare cell 10. In addition, the connection tab 50 may further include a connection unit 60 extending from a region of the body unit 51 and connected to the PCM 30. A shape of the connection tab 50 is not limited to the current embodiment illustrated in FIGS. 1 to 3 and may be determined by the number and connection type of bare cells 10.

In general, the battery pack 100 is adopted as a power source of an electronic device. The adopted electronic device requires various amounts of power in accordance with a specification thereof. The amounts of power may be obtained by serially connecting the plurality of bare cells 10 that form the battery pack 100 or connecting the plurality of bare cells 10 that form the battery pack 100 in parallel through the connection tab 50.

The body unit 51 may be formed of a metal that is an electrical conductor such as nickel (Ni) or copper (Cu) and may be connected to the cap assembly 11 or the bottom 12b corresponding to the electrode unit of the bare cell 10 by the welding unit 53 to become a path of a current. The connection unit 60 extending from an outermost side of the body unit 51 may linearly extend to be connected to the PCM 30 mounted on an external surface of the holder case 20. One side of the connection unit 60 may be bent so as to be easily fastened to the PCM 30. In addition, the connection unit 60 may be integrated with the body unit 51.

The slit unit 52 includes the first slit 52a, the second slit 52b provided to face the first slit 52a, and the welding slit 52e that crosses one point of each of the first and second slits 52*a* and 52*b*. At this time, the first and second slits 52*a* and 52*b* are separated from each other by a certain distance and the first and second bridges 52*c* and 52*d* may be respectively provided between ends of the first and second slits 52*a* and 52*b*. At this time, a distance L2 between a center of the first slit 52*a* and a center of the second slit 52*b* may be smaller than a diameter L1 of the bare cell 10 so as to prevent the connection tab 50 from contacting the upper end 12*a* of the cylindrical can to generate a short circuit. In addition, a length L3 of the welding slit 52*e* may be larger than the distance L2 between the center of the first slit 52*a* and a center of the second slit 52*b* so as to let flow of the current have a shortest distance during welding.

Since the welding slit 52*e* has the above-described length so that the current may flow from the welding unit 53 positioned on one side of the welding slit 52*e* to the welding unit 53 positioned on the other side of the welding slit 52*e* during welding, a wattless current may be reduced. In addition, since heat may be concentrated primarily on the welding unit 53 in which welding is performed, welding efficiency may improve.

At least one welding unit 53 may be provided on each of one side and the other side of the welding slit 52*e* based on the welding slit 52*e*. For example, two welding units 53 may be formed on each of the left and right sides based on the welding slit 52*e* to be adjacent to the welding slit 52*e*.

In FIG. 3, in a plan view seen from above, the welding unit 53 is illustrated as being elliptical. However, the present invention is not limited thereto. A shape of the welding unit 53 may be determined by a worker or based upon implementation.

Figure 4:
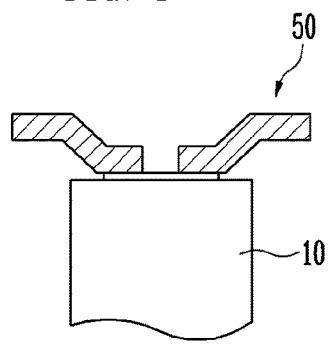
FIG. 4 is a cross-sectional view taken along the line A-A' of FIG. 3.

FIG. 4 is a cross-sectional view taken along the line A-A' of FIG. 3.

Referring to FIG. 4, the first or second bridge 52*c* or 52*d* is stepped so as to block electrical connection between the connection tab 50 and the electrode unit 11 and 12*b* of the bare cell 10 when over-charge or over-discharge occurs. For example, the first and second slits 52*a* and 52*b* are symmetrical with each other, the first and second bridges 52*c* and 52*d* are respectively provided between ends of the first and second slits 52*a* and 52*b*, at least one of the first and second bridges 52*c* and 52*d* is stepped or a notch may be formed in at least one of the first and second bridges 52*c* and 52*d*. When over-charge or over-discharge occurs, after the first or second bridge 52*c* or 52*d* is blocked, the first and second bridges 52*c* and 52*d* are inhibited from contacting the electrode unit 11 and 12*b* of the bare cell 10 again so that it is possible to secure stability of the battery pack 100.

In addition, the first and second bridges 52*c* and 52*d* are integrated with the body unit 51 of the connection tab 50, have predetermined strength so that the current generated by the bare cell 10 may stably flow, and may be formed of a highly heat resistant material so as to inhibit the first and second bridges 52*c* and 52*d* from being damaged by heat generated when the current flows. At this time, the first and second bridges 52*c* and 52*d* may have lower strength or smaller thickness than that of the body unit 51 of the connection tab 50 so as to quickly block the current when it is sensed that something is wrong with the bare cells 10.

Figure 5A:
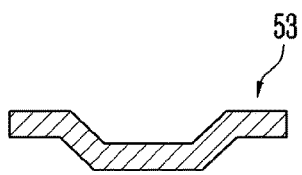
FIG. 5A is a cross-sectional view illustrating a welding unit according to an embodiment of the present invention.
Figure 5B:
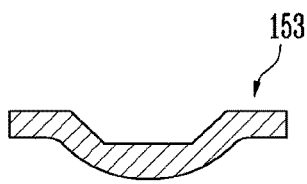
FIG. 5B is a cross-sectional view illustrating a welding unit according to another embodiment of the present invention.

FIG. 5A is a cross-sectional view illustrating a welding unit according to an embodiment of the present invention. FIG. 5B is a cross-sectional view illustrating a welding unit according to another embodiment of the present invention.

Referring to FIGS. 5A and 5B, the welding unit 53 is grooved 53 or embossed 153 with a certain depth in a direction of the electrode unit 11 and 12*b* of the bare cell 10. As described above, the welding unit 53 is grooved 53 or embossed 153 so that it is possible to improve adhesiveness between the electrode unit 11 and 12*b* of the bare cell 10 and the connection tab 50 and to prevent a side surface of the welding unit 53 from being broken after welding.

For example, when the bare cell 10 is cylindrical, the welding unit 53 according to the present invention may be formed in a region corresponding to the cap assembly 11 or the bottom 12*b* corresponding to the electrode unit 11 and 12*b* of the bare cell 10 and may be connected to the electrode unit 11 and 12*b* of the bare cell 10 by welding. That is, when the electrode unit 11 and 12*b* of the bare cell 10 is welded to the welding unit 53, a predetermined current may flow from the welding unit 53 positioned on one side to the welding unit 53 positioned on the other side based on the welding slit 52*e*. At this time, heat is generated by resistance generated between the electrode unit 11 and 12*b* of the bare cell 10 and the connection tab 50 so that welding may be performed.

The welding may be resistance welding. Here, the resistance welding may be projection welding in which welding is performed by limiting a current path by the embossed welding unit 53.

In addition, the shape of the welding unit 53 is not limited to the shapes illustrated in FIGS. 5A and 5B. Various grooves such as a circular groove and a triangular groove may be applied.

As described above, in the battery pack 100, the first and second slits 52*a* and 52*b* and the first or second bridge 52*c* or 52*d* formed to be stepped between the first and second slits 52*a* and 52*b* are provided in the region corresponding to the electrode unit 11 and 12*b* of the bare cell 10 so that it is possible to rapidly and easily block the flow of the current when over-charge or over-discharge occurs and to prevent the connection tab 50 from contacting the upper end 12*a* of the battery case 12 to generate short. Therefore, stability of the battery pack 100 may improve.

In addition, the welding slit 52 is provided to be adjacent to the welding unit 53 so that it is possible to reduce the wattless current and to increase the welding strength during welding.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A battery pack comprising:
a plurality of bare cells including electrode units;
a holder case configured to accommodate the plurality of bare cells; and
a connection tab including a plurality of body units respectively electrically connected to the plurality of bare cells, each body unit having a slit unit positioned on each of the electrode units of the plurality of bare cells, and at least one welding unit positioned to be adjacent to the slit unit and welded to the electrode unit of the bare cell, wherein the slit unit comprises first and second slits separated from each other by a certain distance, first and second bridges respectively provided between ends of the first and second slits, and a welding slit that intersects at least a portion of each of the first and second slits.

2. The battery pack of claim 1,
wherein the first and second bridges are integrated with the body unit, and
wherein at least one of the first and second bridges is formed to be stepped.

3. The battery pack of claim 1, wherein the first and second slits face each other.

4. The battery pack of claim 1, wherein a distance between a center of the first slit and a center of the second slit is smaller than a diameter of the bare cell.

5. The battery pack of claim 1, wherein a length of the welding slit is larger than the distance between a center of the first slit and a center of the second slit.

6. The battery pack of claim 1, wherein at least one first welding unit is located on a first side of the welding slit and at least one second welding unit is located on a second side of the welding slit opposite the first side.

7. The battery pack of claim 6, wherein the welding unit is grooved or embossed with a certain depth in a direction of the electrode unit of the bare cell.

8. The battery pack of claim 1, wherein the welding unit is connected to the electrode unit of the bare cell by resistance welding.

9. The battery pack of claim 1, wherein the connection tab further comprises a connection unit extending from a region of the connection tab and connected to a protective circuit module (PCM) mounted on an external surface of the holder case.

10. The battery pack of claim 1, wherein the bare cell is cylindrical or prismatic.

11. A battery pack comprising
a plurality of bare cells that have an electrode;
a holder case that receives the plurality of bare cells;
a connection tab that includes a plurality of body units that are respectively coupled to the bare cells, wherein the body units each comprise:
a first and a second slit that are arranged in an arc and are separated from each other,
a first and second welding unit that are respectively positioned adjacent the first and second slit,
first and second bridge members that extend between the first and second slits and interconnect the first and second welding units to the connection tab, and
a welding slit that intersects at least a portion of each of the first and second slits.

12. The battery pack of claim 11, wherein the intersection of the welding slit and the first and second slits is substantially near a center of each arc formed by each of the first and second slits.

13. The battery pack of claim 11, wherein the first and second bridges are formed to be stepped.

14. The battery pack of claim 11, wherein the distance between a center of the first slit and a center of the second slit is smaller than a diameter of one of the bare cells.

15. The battery pack of claim 11, wherein a length of the welding slit is larger than the distance between a center of the first slit and a center of the second slit.

16. The battery pack of claim 11, wherein the welding unit comprises a first surface with an indented surface formed therein.

17. The battery pack of claim 16, wherein the indented surface is grooved or embossed to be indented a certain depth.

18. The battery pack of claim 11, wherein the connection tab further comprises a connection unit extending from a region of the connection tab and connected to a protective circuit module (PCM) mounted on an external surface of the holder base.

19. The battery pack of claim 11, wherein the bare cells are cylindrical or prismatic.

* * * * *